(12) United States Patent
Matsuyama

(10) Patent No.: US 7,391,530 B2
(45) Date of Patent: Jun. 24, 2008

(54) PRINTING APPARATUS

(75) Inventor: Ichiro Matsuyama, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 1009 days.

(21) Appl. No.: 10/618,013

(22) Filed: Jul. 14, 2003

(65) Prior Publication Data

US 2004/0012796 A1 Jan. 22, 2004

(30) Foreign Application Priority Data

Jul. 17, 2002 (JP) ............................. 2002-208887
May 20, 2003 (JP) ............................. 2003-142653

(51) Int. Cl.
*G06K 15/02* (2006.01)
*H04N 1/387* (2006.01)
*H04N 1/393* (2006.01)

(52) U.S. Cl. ................... 358/1.2; 358/1.18; 358/450; 358/451; 715/200

(58) Field of Classification Search ............... 358/1.18, 358/1.15, 1.12, 450, 451, 1.2, 284, 291, 294, 358/298; 382/284, 289, 291, 294, 298; 715/200, 715/243, 251–253
See application file for complete search history.

(56) References Cited

U.S. PATENT DOCUMENTS

| | | | |
|---|---|---|---|
| 6,188,490 B1 * | 2/2001 | Miyake | 358/1.18 |
| 6,301,013 B1 | 10/2001 | Momose et al. | 358/1.15 |
| 6,575,554 B2 | 6/2003 | Yoshinaga | 347/22 |
| 2002/0069228 A1 * | 6/2002 | Mori et al. | 707/524 |
| 2003/0020956 A1 * | 1/2003 | Goel et al. | 358/1.18 |

FOREIGN PATENT DOCUMENTS

| | | | |
|---|---|---|---|
| JP | 11-147345 | | 6/1999 |
| JP | 2001147788 A | * | 5/2001 |
| JP | 2002-187261 | | 7/2002 |

\* cited by examiner

*Primary Examiner*—Kimberly A Williams
(74) *Attorney, Agent, or Firm*—Fitzpatrick, Cella, Harper & Scinto

(57) ABSTRACT

A printing apparatus includes a generation unit for generating one page of a print image which is larger than one sheet of paper, and a printing unit for performing printing on one sheet of paper based on one page of the print image, which is larger than the paper and generated by the generation unit. The generation unit, based on an allocation number representing the number of pages to be allocated to one sheet of paper, performs clipping to remove a portion of the print data which can be printed by the printing unit to prevent the print image of each page which is not printed from deviating the image of each page, when a plurality of pages of print data printed on one sheet of paper are generated.

26 Claims, 14 Drawing Sheets

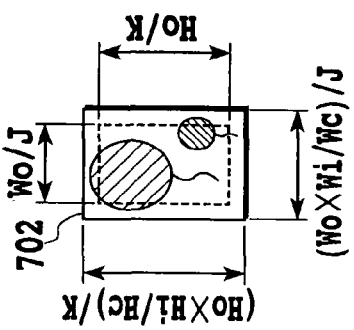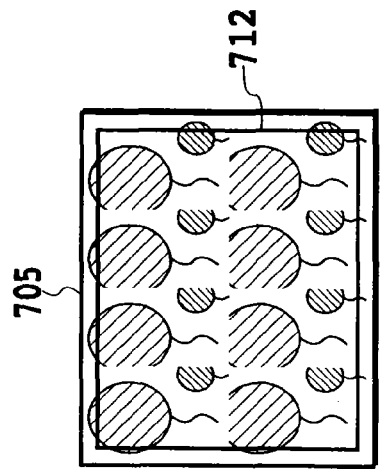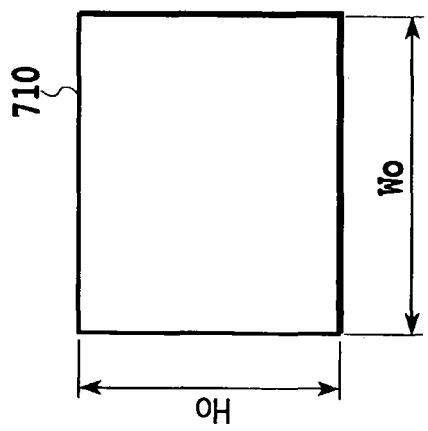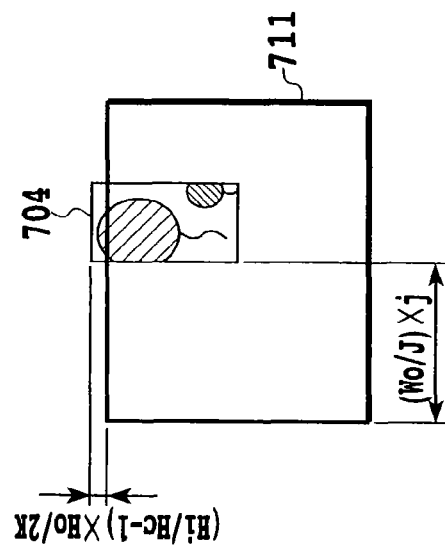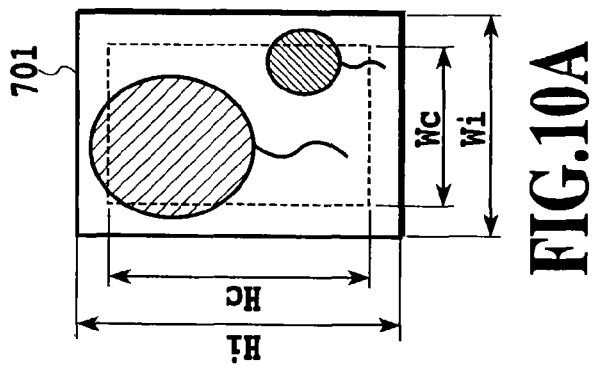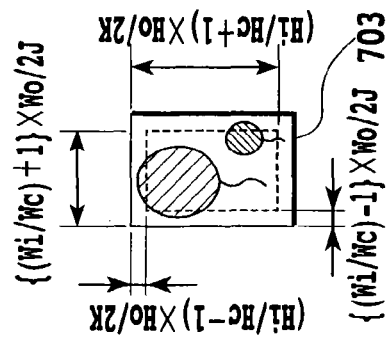

PRINTING APPARATUS

This application claims priority from Japanese Patent Application Nos. 2002-208887 and 2003-142653 filed Jul. 17, 2002 and May 20, 2003, respectively, which are incorporated hereinto by reference.

BACKGROUND OF THE INVENTION

1. Field of the Invention

The present invention relates to a printing apparatus and more specifically to a printing apparatus, a printing method and a program which perform printing by assigning print data for two or more pages to one sheet of paper in a marginless printing system.

2. Description of the Related Art

With a price reduction and performance improvement of so-called digital cameras in recent years, a system for printing image data shot by a digital camera with a printer has come into use in addition to an existing system by which a photograph is shot and printed using a conventional silver salt picture film.

FIG. 5 shows a printing system in which a host computer and a printing apparatus are interconnected through an interface. In the printing system of FIG. 5 consisting of a host computer 1002 and a printer 1003, a variety of data editing is performed by various application programs running on the host computer 1002. Then the edited data is output as print data through an interface 1001 (e.g., Ethernet®), USB and IEEE1394) to the printer 1003 for printing. In this printing system, when print data is to be printed by the printer 1003, the associated application program causes a printer driver operational on the host computer 1002 to display a dialog box for a user to specify print parameters such as paper size used for printing before the application outputs the print data.

In a printing system in which a digital camera is used in place of the host computer, shot image data is output as print data from the digital camera through the interface to the printer for printing. Further, in a printing system in which a storage media is connected to the printer, image data stored in the storage media is output as print data to the printer for printing. In these printing systems, an operation unit of the digital camera or of the printer allows the user to specify the print parameters such as paper size.

There is a general trend for silver salt pictures being printed with no blank margins and, in line with this tendency, printers have entered the market which allow for a printing without leaving blank margins (referred to simply as a marginless printing) to produce photograph-like prints. Many of these printers, as shown in FIG. 1, realize the marginless printing by outputting a print image 501 of a Wi×Hi size, slightly larger than an effective print area of a print medium, Wc×Hc, to produce a printed image slightly overrunning the edges of the effective area of the print medium. In some printers, the image output for those portions outside the effective area is printed to exactly the edges of the print medium and, in others, the overrunning printed portions are cut away (Japanese Patent Application Laid-Open No. 2002-187261).

Meanwhile, there are printers and printing systems available which, to reduce the number of printed sheets or to provide an overall view of a document, compresses a plurality of pages of print data and allocate them to one sheet of paper for printing (multipage printing function). For example, a plurality of pages of print images, like the ones 501 of Wi×Hi size shown in FIG. 1, are assigned to divided areas 801-804 of a single sheet 810 and printed, as shown in FIG. 3. While in FIG. 3, all the printed images shown are the same, actual printed images assigned to one page may be different (Japanese Patent Application Laid-Open No. 11-147345 (1999)).

When a multipage printing, such as shown in FIG. 3, is performed in a marginless printing mode of FIG. 1, a combination of multiple print images is generated as print data of a size slightly larger than and overrunning the effective area of the print medium 610, as shown in FIG. 2. That is, an output image 601 is generated which comprises a plurality of print data arranged to contact with each other at their sides, and this output image is printed. Individual printed images 901-904 in FIG. 4 are each deviated from their own print areas. Particularly when the same images are to be printed, a problem arises that the way the individual images are deviated varies from one print area to another.

SUMMARY OF THE INVENTION

The present invention has been accomplished to overcome these problems and provides a printing apparatus that can perform a marginless printing without deviating allocated positions of print data even when a multipage printing function is used.

To achieve this objective, the present invention provides a printing apparatus comprising: a generation unit for generating a print image to be printed on an area larger than an effective area of paper; and a printing unit for printing the print image generated by the generation unit and larger than the effective area of the paper; wherein the generation unit generates the print image of clipped pages based on an allocation number specified by a specifying unit and representing the number of pages to be allocated to one sheet of paper.

The generation unit generates a print image by subjecting the pages to zoom processing according to the allocation number specified by the specifying unit and representing the number of pages to be allocated to one sheet of paper.

Further, the clipping performed by the generation unit executes processing on print data allocated to the effective area of the paper including its boundary and different processing on print data allocated to other areas of the paper.

Further, the number of print data to be allocated to one sheet of paper, specified by the specifying unit, is entered as positive integers one for each of x and y directions of the paper.

Further, the number of pages to be allocated to one sheet of paper, specified by the specifying unit, is calculated for each of the x and y directions based on an entered value and on x- and y-direction sizes of the paper.

Further, the printing unit can print a print image that is output with at least one side of the paper taken as an arbitrary size, and the generation unit specifies to the printing unit a size of one side of the paper based on the allocation number entered as positive integers for the x and y directions, and outputs the print image to the printing unit.

Further, to achieve the above objective, the present invention provides a printing method comprising: a generation step of generating a print image to be printed on an area larger than an effective area of paper; and a printing step of causing a printing unit to print the print image generated by the generation step and larger than the effective area of the paper; wherein the generation step generates the print image of clipped pages based on an allocation number specified by the specifying unit and representing the number of pages to be allocated to one sheet of paper.

The generation step generates a print image by subjecting the pages to zoom processing according to the allocation number specified by the specifying unit and representing the number of pages to be allocated to one sheet of paper.

Further, the clipping performed by the generation step executes processing on print data allocated to the effective area of the paper including its boundary and different processing on print data allocated to other areas of the paper.

Further, the number of print data to be allocated to one sheet of paper, specified by the specifying unit, is entered as positive integers one for each of x and y directions of the paper.

Further, the number of pages to be specified to one sheet of paper, specified by the specifying unit, is calculated for each of the x and y directions based on an entered value and on x- and y-direction sizes of the paper.

Further, the printing step can print a print image that is output with at least one side of the paper taken as an arbitrary size, and the generation step specifies to the printing step a size of one side of the paper based on the allocation number entered as positive integers for the x and y directions, thereby causing the printing step to print the print image.

Further, to realize the above objective, the present invention provides a computer-readable program comprising: a generation step of generating a print image to be printed on an area larger than an effective area of paper; and a step of outputting to a printing unit the print image generated by the generation step and larger than the effective area of the paper; wherein the generation step generates the print image of clipped pages based on an allocation number specified by a specifying unit and representing the number of pages to be allocated to one sheet of paper.

Here, the generation step generates a print image by subjecting the pages to zoom processing according to the allocation number specified by the specifying unit and representing the number of pages to be allocated to one sheet of paper.

Further, the clipping performed by the generation step executes processing on print data allocated to the effective area of the paper including its boundary and different processing on print data allocated to other areas of the paper.

Further, the number of print data to be allocated to one sheet of paper, specified by the specifying unit, is entered as positive integers one for each of x and y directions of the paper.

Further, the number of pages to be allocated to one sheet of paper, specified by the specifying unit, is calculated for each of the x and y directions based on an entered value and on x- and y-direction sizes of the paper.

Further, the printing step can print a print image that is output with at least one side of the paper taken as an arbitrary size, and the generation step specifies to the printing step a size of one side of the paper based on the allocation number entered as positive integers for the x and y directions, thereby causing the printing step to print the print image.

As described above, the printing apparatus of this invention comprises: an input buffering unit for storing a plurality of pages of print data read from an input unit; an allocation unit for performing affine transformation and clipping on the plurality of pages of print data stored in the input buffering unit according to an allocation number specified by a specifying unit and representing the number of print data to be allocated to one sheet of paper and then allocating the processed print data to the print image; and an output buffering unit for storing the print image for one sheet of paper. Therefore, even when a multipage printing function is used, the marginless printing can be performed without deviating the allocated positions of the print data.

The above and other objects, effects, features and advantages of the present invention will become more apparent from the following description of embodiments thereof taken in conjunction with the accompanying drawings.

BRIEF DESCRIPTION OF THE DRAWINGS

FIGS. 10A to 10F are schematic diagrams showing the enlargement/reduction processing and the allocation processing;

DETAILED DESCRIPTION OF PREFERRED EMBODIMENTS

Figure 1:
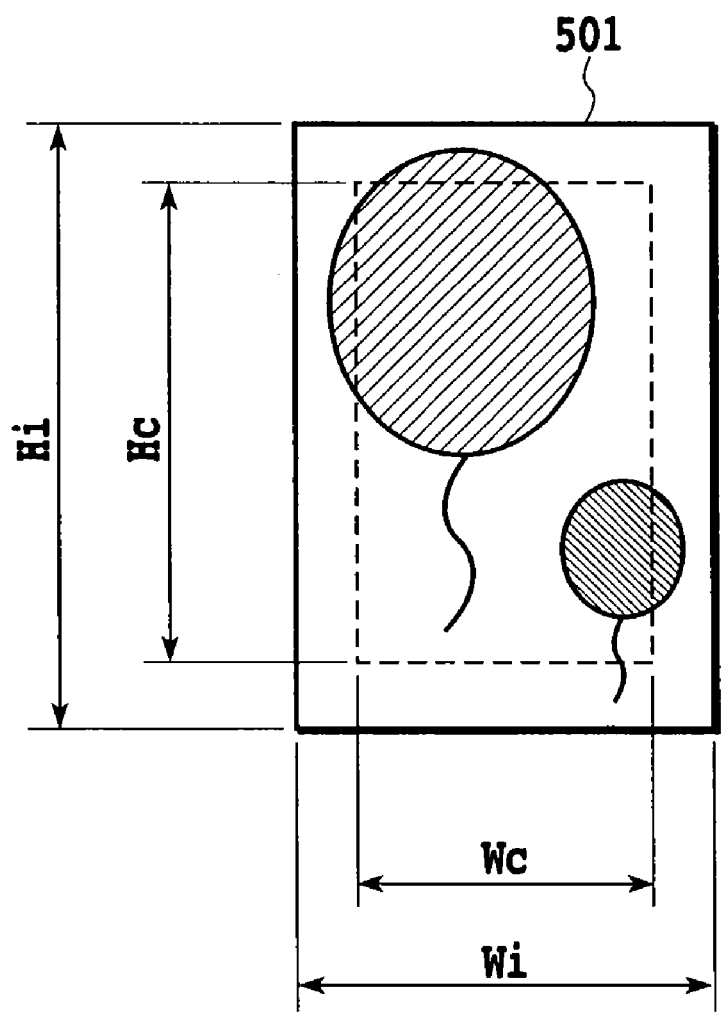
FIG. 1 is a diagram showing conventional inputted print data.
Figure 2:
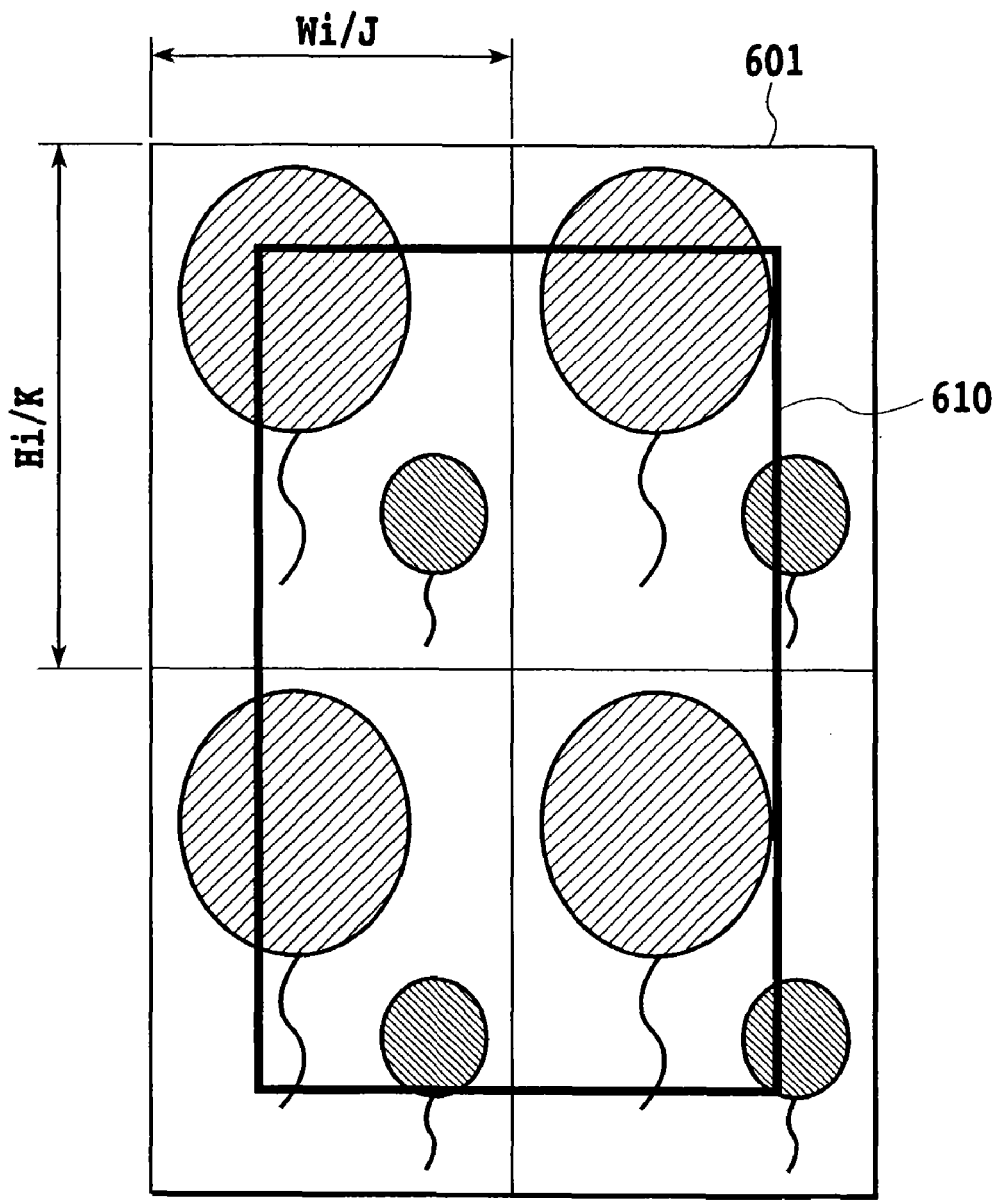
FIG. 2 is a diagram showing a result of performing a multipage printing in a marginless printing mode using a conventional technique.
Figure 3:
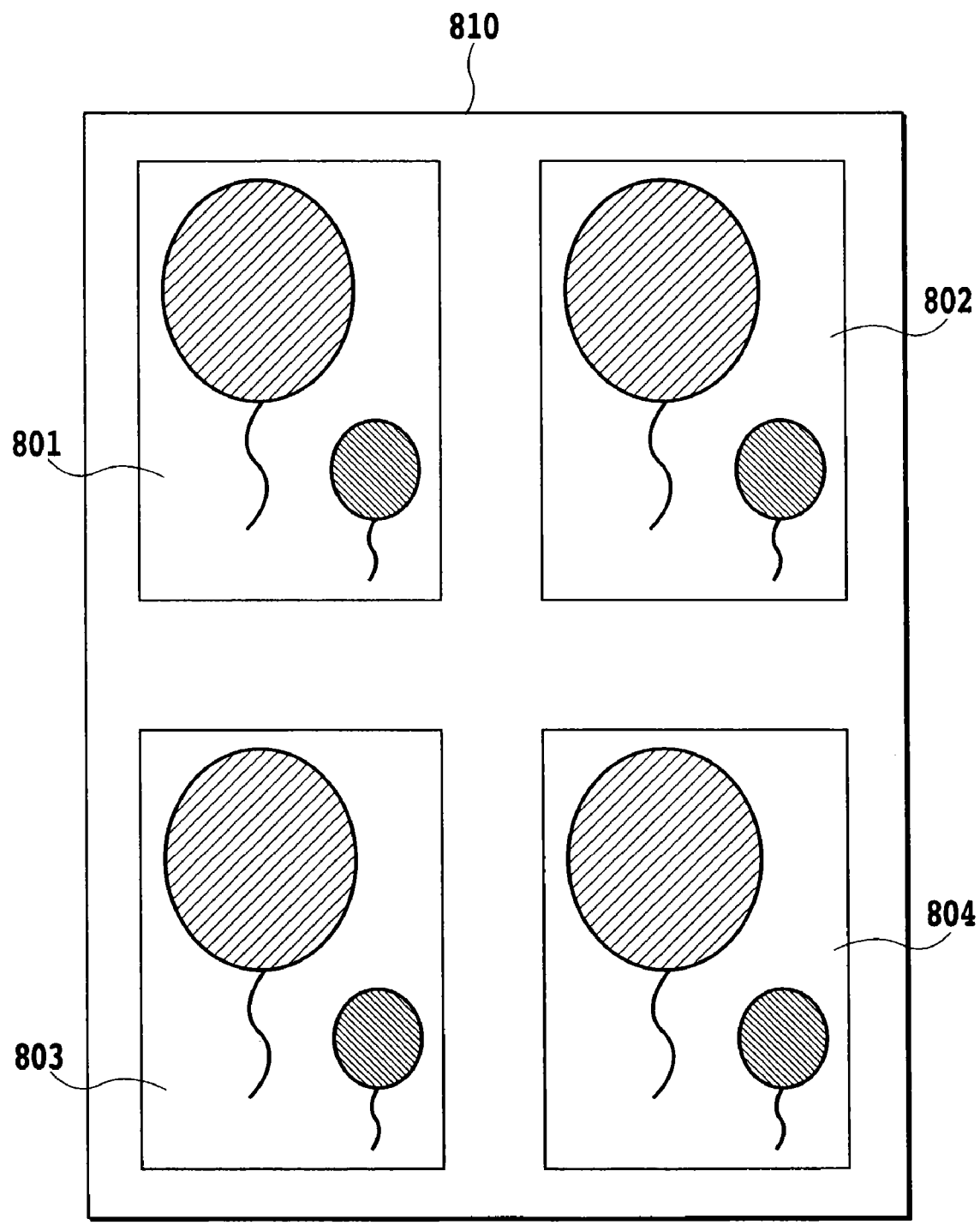
FIG. 3 is a diagram showing a result of performing a multipage printing in a margined printing mode using a conventional technique.
Figure 4:
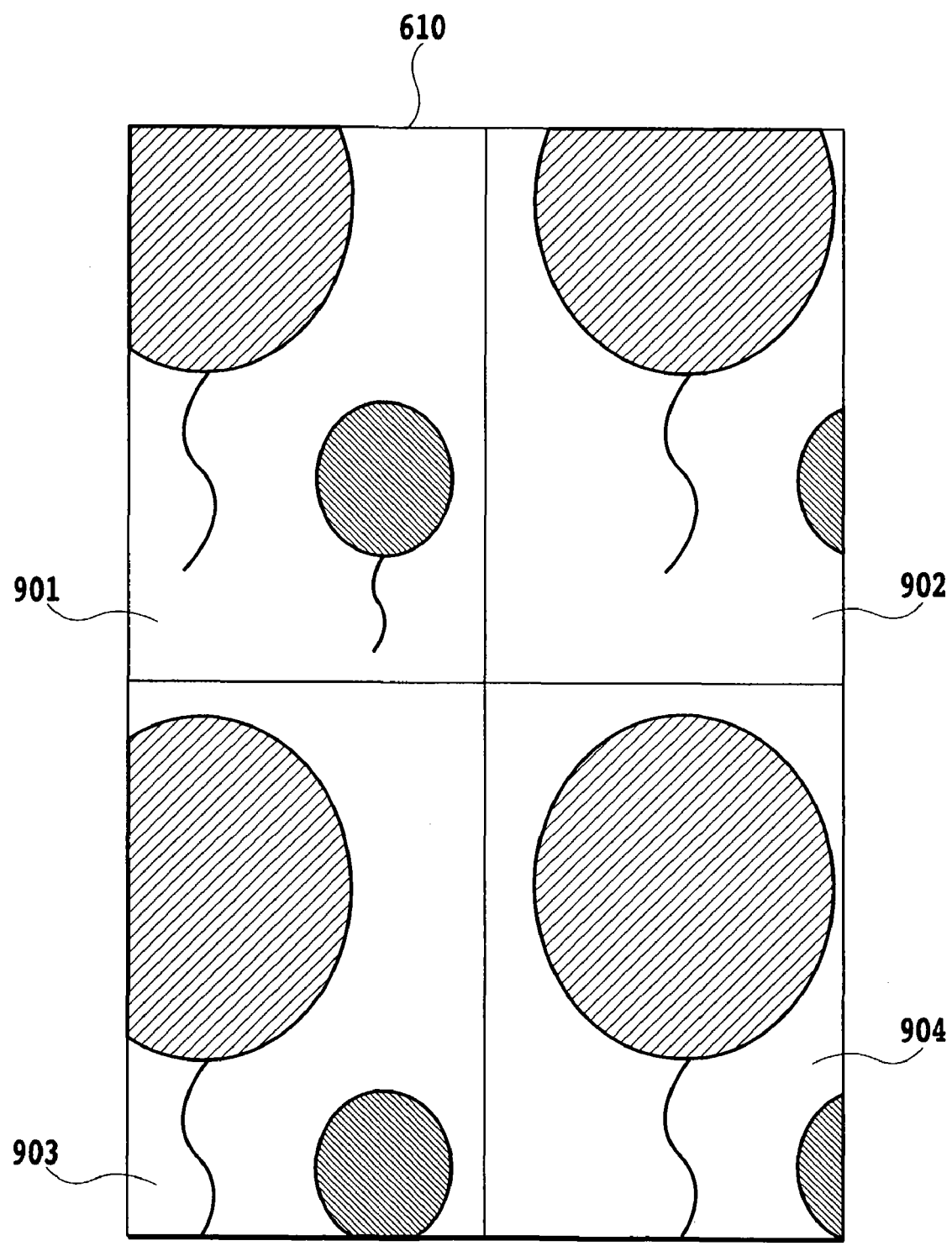
FIG. 4 is a diagram showing a result of performing a multipage printing in a marginless printing mode using a conventional technique.
Figure 5:
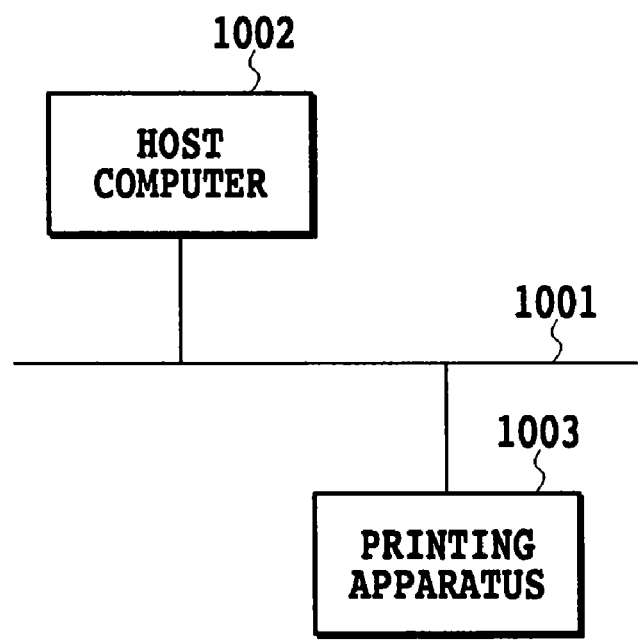
FIG. 5 is a block diagram showing a conventional printing system in which a host computer and a printing apparatus are interconnected via an interface.

Embodiments of the present invention will be described in detail by referring to the accompanying drawings. Throughout the drawings, components with identical functions are assigned like reference numerals.

First Embodiment

Figure 6:
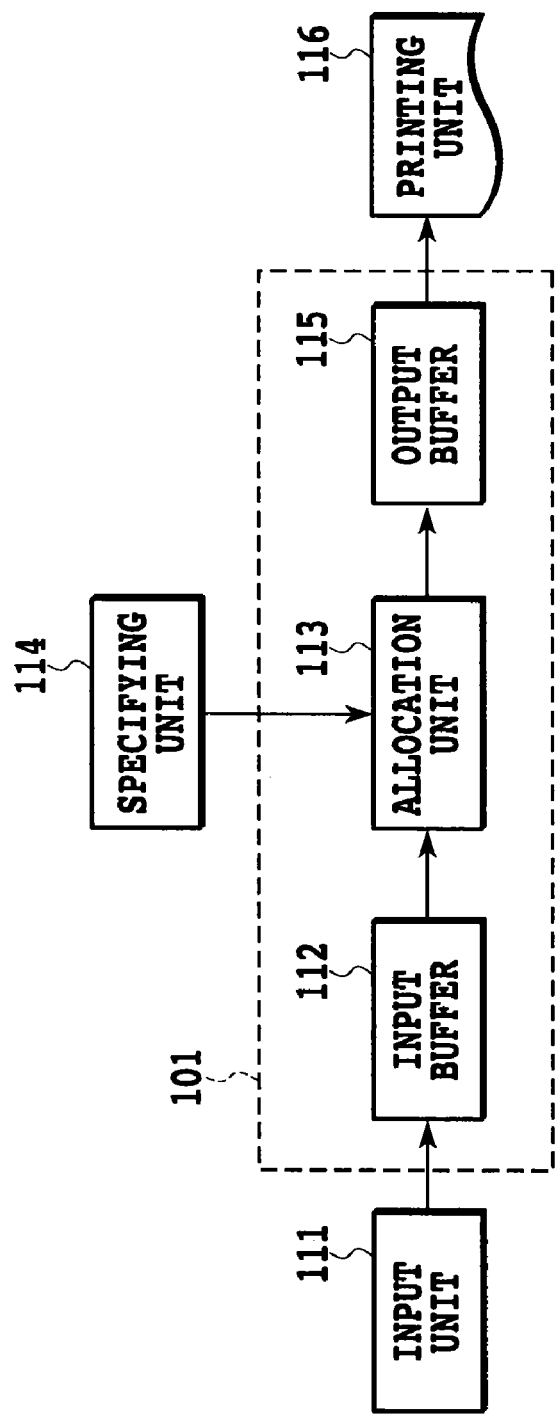
FIG. 6 is a block configuration diagram showing a first embodiment of a printing apparatus according to the present invention.

FIG. 6 is a block configuration diagram showing a first embodiment of a printing apparatus of this invention. In the figure, reference number 101 represents a printing apparatus, 111 an input unit, 112 an input buffer, 113 an allocation unit, 114 a specifying unit, 115 an output buffer, and 116 a printing unit. The printing apparatus 101 comprises the input buffer 112, the allocation unit 113 and the output buffer 115.

In this configuration, a plurality of pages of input print data is stored from the input unit 111 into the input buffer 112. The number of input print data J, K to be allocated to one sheet of print medium is entered from the specifying unit 114, where J and K are positive integers representing the number of print data to be allocated in x direction and y direction on one sheet. Let a size of print data in X and Y directions be $W_i$ and $H_i$ and resolutions (number of pixels printed) in these directions be $R_w$ and $R_h$. A value that can be entered as the number of print data is limited to 1≦J≦Rw and 1≦K≦Rh. If the size of a print medium is about ISO-A4, for example, it is preferred that J and K be integers in a range of between 1 and 4 to prevent the print data of one page from becoming too small.

The allocation unit 113 reads the input print data one page at a time from the input buffer 112 and enlarges or reduces the print data according to the entered values of J and K. Then, the allocation unit 113 clips an area of the print data according to the position on the paper at which the print data is allocated, and outputs the clipped print data to a print image in the output buffer 115. After all the print data for one sheet of paper are allocated to the print image, the allocation unit 113 outputs the print image to the printing unit 116 which then prints it on paper.

Figure 7:
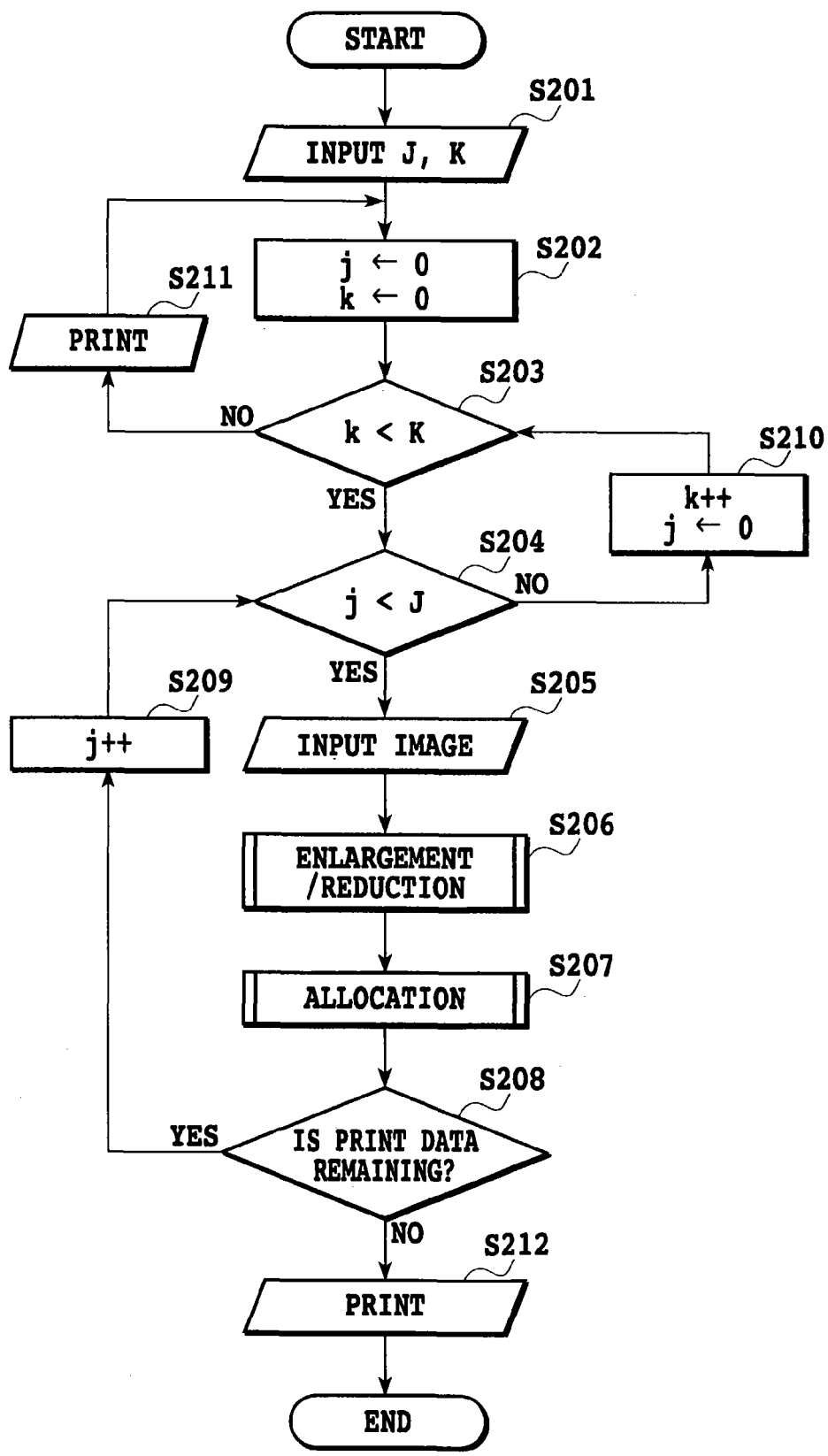
FIG. 7 is a flow chart showing operations performed by an allocation unit of FIG. 6 according to the first embodiment.

FIG. 7 shows a flow chart describing the operation performed by the allocation unit 113 of FIG. 6. First, the number of pages of print data to be allocated to one sheet of paper (the number of input print data, J and K) is entered from the specifying unit 114 in step S201. In step S202, counters j, k are initialized to zero. In step S203 if k<K, the program moves to step S204 to check if j<J. If so, the program proceeds to step S205 where it reads one page of print data from the input buffer 112.

At step S206 the print data is enlarged/reduced and at step S207 the enlarged/reduced print data is allocated to a print image in the output buffer 115. At step S208 if there is still print data remaining in the input buffer 112, the program increments the counter j at step S209 before returning to step S204. At step S204 if the condition j<J is not met, the program increments the counter k and initializes the counter j to zero before returning to step S203. At step S203 if k<K is not established, the program outputs the print image in the output buffer 115 to the printing unit 116 for printing, after which the program returns to step S202.

At step S208 if there is no print data in the input buffer 112, step S212 outputs the print image in the output buffer 115 to the printing unit 116 for printing and the processing is ended.

That is, according to the allocation number entered from the specifying unit 114 which specifies the number of print data to be allocated to one sheet, the allocation unit 113 performs an affine transformation (combination of linear transformation and parallel translation) and clipping (removal of unnecessary areas) on a plurality of print data stored in the input buffer 112 and then outputs the processed print data to the print image.

Figure 8:
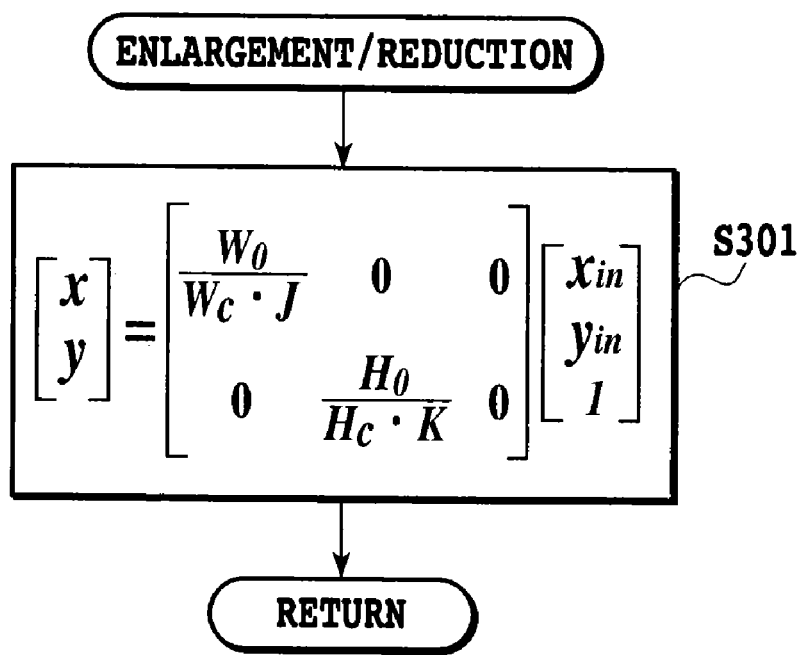
FIG. 8 is a flow chart showing enlargement/reduction processing in step S206 of FIG. 7.

FIG. 8 is a flow chart describing the enlargement/reduction processing in step S206 of FIG. 7. First, the print data 701 of FIG. 10A read in at step S205 is enlarged or reduced by a transformation matrix of step S301 according to the size of the effective area of the print medium 710 in FIG. 10B and the number of print data to be allocated. As a result, data 702 shown in FIG. 10C is produced. In this step S301, [xin, yin] is a coordinate of the print data 701 before being enlarged or reduced, and [x, y] is a coordinate of the data 702 after the enlargement/reduction processing.

Here, Wi and Hi are x- and y-direction sizes of the print data as it is input, and Wc and Hc are x- and y-direction sizes of the print data to be printed on the effective area of the print medium. Wo and Ho are x- and y-direction sizes of the print medium. The transformation matrix changes the x-direction size of the print data to Wo/(Wc·J) times the original size and the y-direction size to Ho/(Hc·K) times the original size.

Figure 9:
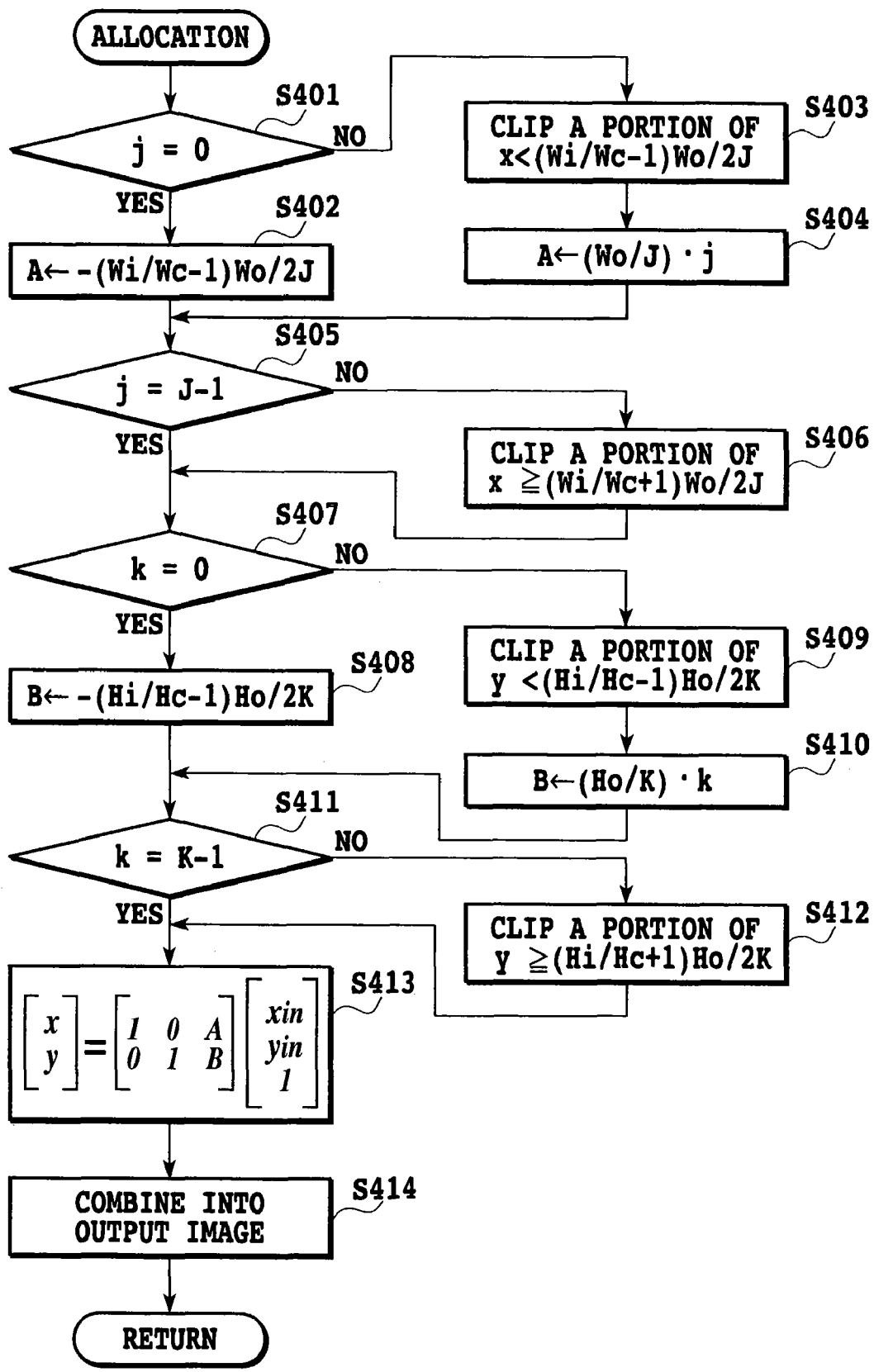
FIG. 9 is a flow chart showing allocation processing in step S207 of FIG. 7 according to the first embodiment.

FIG. 9 is a flow chart showing allocation processing performed at step S207 of FIG. 7. First, at step S401 if a counter j is j=0, then at step S402 −(Wi/Wc−1)Wo/2J is substituted into A, where A is a variable for data substitution described later.

If at step S401 the counter j is not j=0, then at step S403 a portion of the print data represented by a coordinate [x, y] in which x<(Wi/Wc−1)Wo/2J holds is clipped. At step S404 (Wo/J)·J is substituted into A. Here y is an arbitrary value. Next, at step S405 if the counter j is not j=J−1, at step S406 a portion of the print data represented by a coordinate [x, y] in which x≧(Wi/Wc+1)Wo/2J holds is clipped. Here y is an arbitrary value.

Next, at step S407 if a counter k is k=0, at step S408 −(Hi/Hc−1)Ho/2K is substituted into B, where B is a variable for data substitution described later. If at step S407 the counter k is not k=0, at step S409 a portion of the print data represented by a coordinate [x, y] in which y<(Hi/Hc−1)Ho/2K holds is clipped. Then at step S410 (Ho/K)·k is substituted into B. Here x is an arbitrary value.

Next, at step S411 if the counter k is not k=K−1, at step S412 a portion of the print data represented by a coordinate [x, y] in which y≧(Hi/Hc+1)Ho/2K holds is clipped. Here x is an arbitrary value. With these steps taken, the data 702 which was enlarged/reduced as shown in FIG. 10C is partly clipped according to the values of the counters j, k, as shown in FIG. 10D, to become data 703.

Next, at step S413 the data 703 is parallelly moved a distance A in the x direction and B in the y direction with respect to the sheet of paper 711 by the above-described transformation matrix involving A and B to produce data 704, as shown in FIG. 10E. In this step S413, [xin, yin] represents a coordinate of the data 703 before being parallelly translated, and [x, y] represents a coordinate of the data 704 after the parallel translation processing.

If the above processing has been done with, for example, J=4 and K=2, then at step S414 output images for the paper 712 are combined to form a print image 705, as shown in FIG. 10F, with individual print data allocated to their associated areas on the paper without deviations.

If the above steps are executed with, for example, J=4 and K=2, the print image 705 is printed on paper 712, as shown in FIG. 10F, with individual print data allocated to their associated areas on the paper without deviations.

That is, print data are allocated to divided print areas of a sheet of paper and set larger than the associated print areas. The allocated print data are clipped to remove portions overrunning the associated divided print areas to generate a plurality of print data that match the associated divided print areas in such a way that a positional relationship of each generated print data with respect to the associated divided print area is identical to a positional relationship, with respect to an undivided print area of the sheet of paper, of the same print data set larger than the undivided print area (as in the relationship between data 701 and data 703).

Second Embodiment

Next, a second embodiment of this invention will be described.

A printing apparatus of this embodiment is similar to that of the first embodiment except for the input specification from the specifying unit 114 and for the allocation processing performed by the allocation unit 113.

Figure 11:
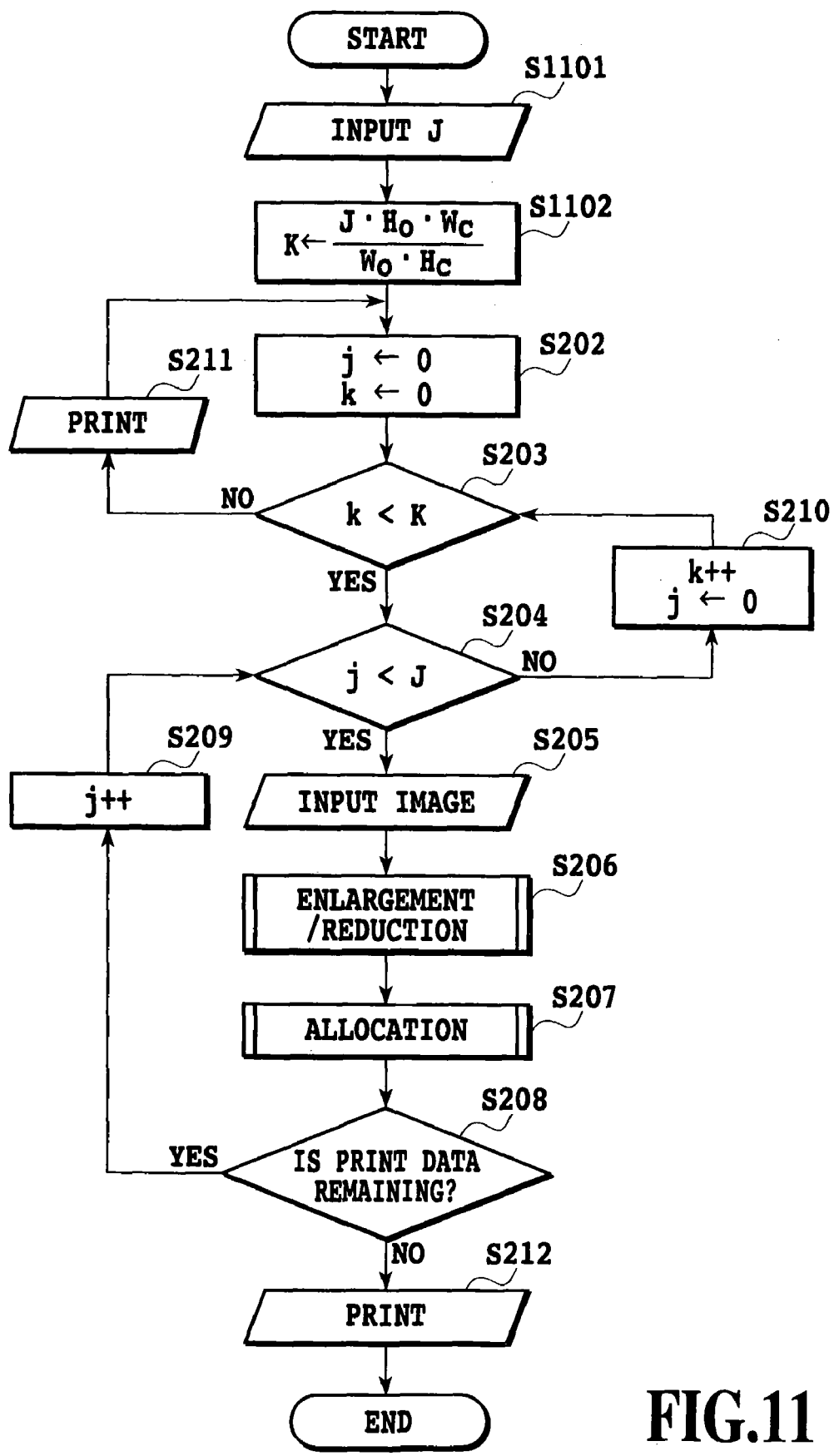
FIG. 11 is a flow chart showing operations performed by the allocation unit of FIG. 6 according to a second embodiment.
Figure 12:
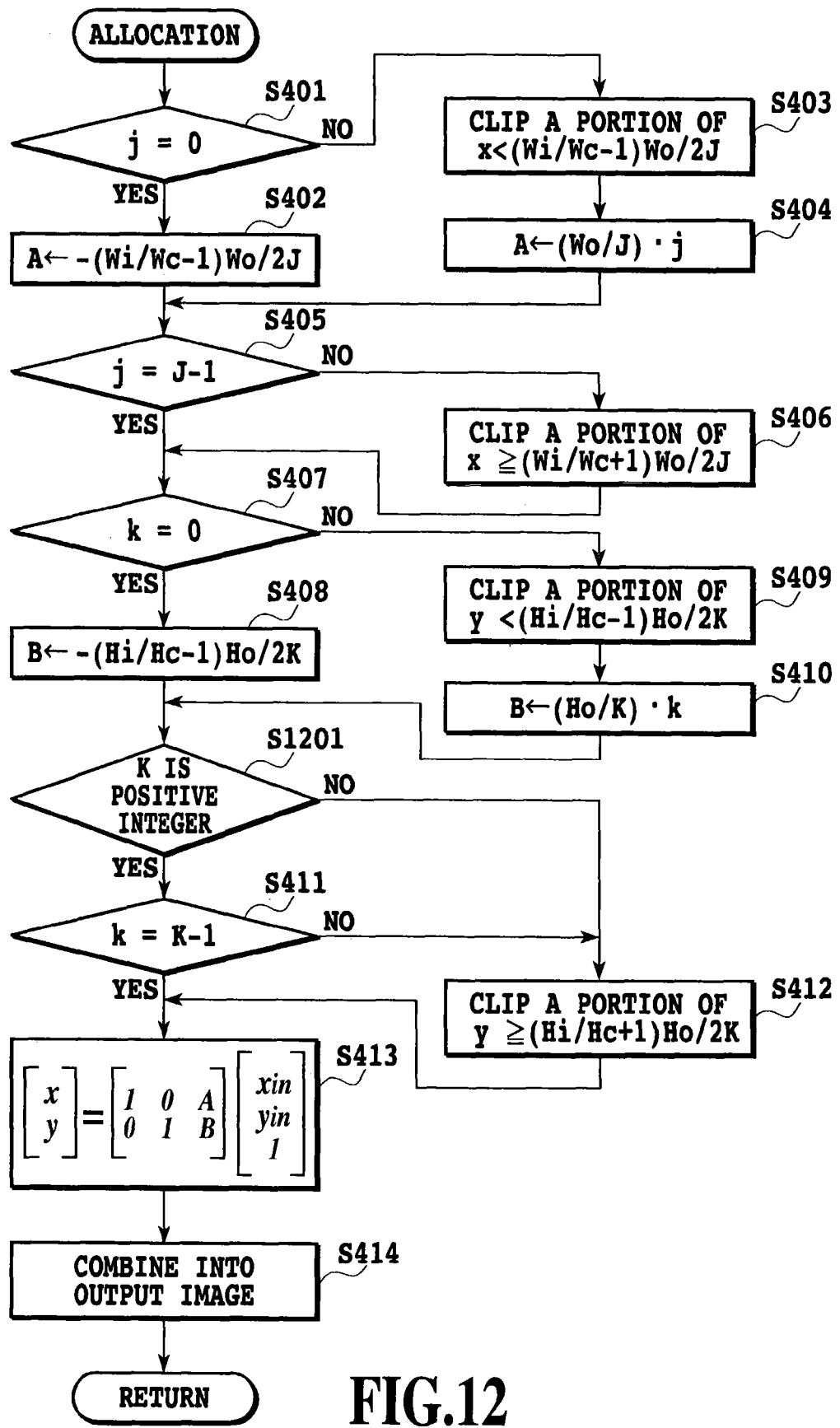
FIG. 12 is a flow chart showing allocation processing in step S207 of FIG. 7 according to the second embodiment.

FIG. 11 is a flow chart showing operations performed by the allocation unit of FIG. 6. The processing in FIG. 11 is similar to that of the first embodiment except for steps S1101 and S1102. FIG. 12 is a flow chart showing the allocation processing performed by step S207 in FIG. 11. The processing in FIG. 12 is similar to that of the first embodiment except for step S1201.

In step S1101, only the number of input print data that are to be allocated to one sheet of paper, J, is entered from the specifying unit 114 of FIG. 6. Here, J is a positive integer representing the number of print data to be allocated in the x direction. In step S1102, J·Ho·Wc/(Hc·Wo) is substituted for the value K representing the number of print data to be allocated in the y direction. This enables a multipage printing while maintaining the ratio Hi/Wi between the x- and y-direction sizes of the print data 701.

However, when the value of K is not a positive integer, at step S1201 in the allocation processing of FIG. 12, the decision of step S411 is nullified and the clipping at step S412 is always performed.

If the value of K is not a positive integer, the print data, which is read out from the input buffer 112 at step S205 in the flow chart of FIG. 11 when K−1k≦K, is printed overrunning the paper to a greater extent than the print data read out when 0≦k<K−1.

Third Embodiment

Next, a third embodiment of the present invention will be explained.

A printing apparatus of this embodiment is similar to that of the first embodiment except for the printing unit 116.

Figure 13:
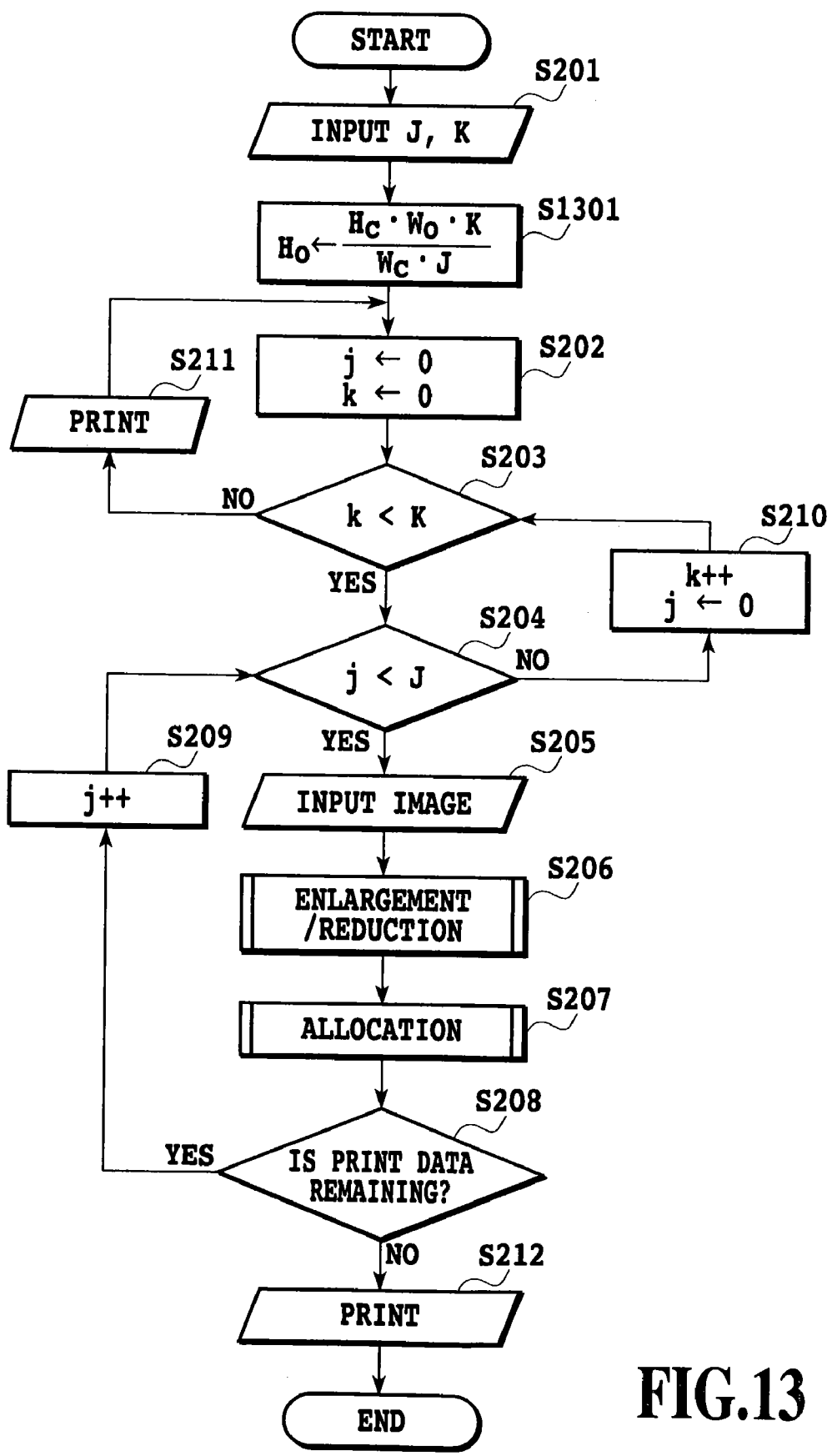
FIG. 13 is a flow chart showing operations performed by the allocation unit of FIG. 6 according to a third embodiment.

FIG. 13 is a flow chart describing operations performed by the allocation unit of FIG. 6. The processing of FIG. 13 is similar to that of the first embodiment except for step S1301.

That is, the printing unit 116 shown in FIG. 6 prints on rolled paper and the y-direction size Ho of the paper can be set arbitrarily for each printing operation. The number of input print data to be allocated to one sheet of paper, J and K, is entered from the specifying unit 114. Here, J and K are positive integers representing the number of print data to be allocated in the x and y directions, respectively. At step S1301 the allocation unit 113 sets the y-direction size Ho of the paper to Hc·Wo·K/(Wc·J) in the printing unit 116.

As a result, the multipage printing can be performed while maintaining the ratio Hi/Wi between the x- and y-direction sizes of the print data 701. Further, all the multiple pages of print data can be printed without a deviation.

Fourth Embodiment

Next, a fourth embodiment of the present invention will be explained.

A printing apparatus of this embodiment differs from that of the first embodiment in that the allocation of print images is performed by a host computer connected to the printing apparatus.

Figure 14:
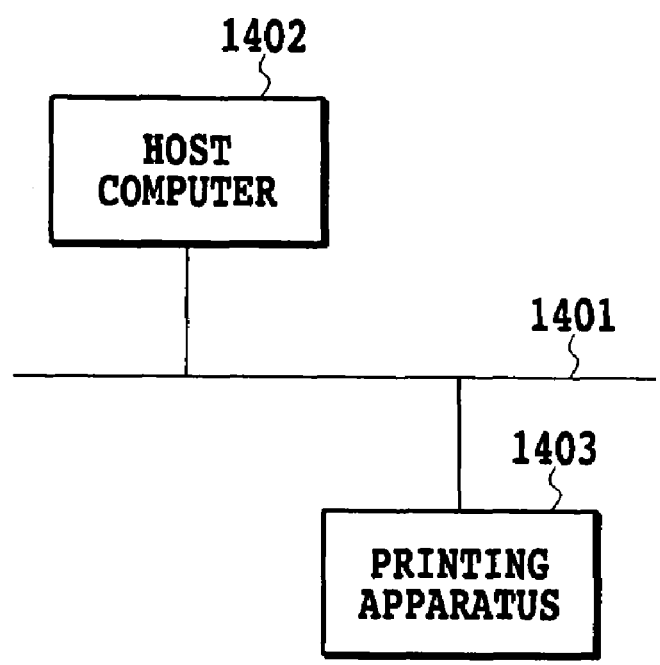
FIG. 14 is a block diagram showing a printing system according to a fourth embodiment of this invention in which a host computer and a printing apparatus are interconnected via an interface.

FIG. 14 illustrates a printing system in which a host computer and a printing apparatus are interconnected via an interface. In the printing system of FIG. 14 made up of a host computer 1402 and a printer 1403, a variety of data editing is performed by various application programs running on the host computer 1402. Then the edited data is output as print data through an interface 1401 (e.g., Ethernet®, USB and IEEE1394) to the printer 1403 for printing. In this printing system, when print data is to be printed by the printer 1403, the associated application program causes a printer driver operational on the host computer 1402 to display a dialog box for a user to specify print parameters such as paper size used for printing before the application outputs the print data.

The printer driver active on the host computer 1402 in FIG. 14 displays a dialog box for the user to enter the allocation numbers J, K as the print specification parameters, and performs allocation processing, as shown in FIG. 7, FIG. 8 and FIG. 9, on the image data edited by the application program.

Then, the host computer sends the print data, made up of J×K pages of print image allocated to one sheet of paper 712 as shown in FIG. 10F, through the interface 1401 to the printer 1403 for printing. The allocation processing may be performed by an application program rather than the printer driver. In this case, the application program can also output the print data to the printer 1403 without passing it through the printer driver.

In this way, the print image for one sheet of paper sent from the host computer can be marginless-printed without the allocated print data positions being deviated, by using the multipage printing function even in a printing system that uses a printing apparatus not capable of buffering the print image.

General Descriptions of Embodiments

General descriptions of embodiments of the present invention will be explained below.

[Description 1]

A printing apparatus which inputs a plurality of pages of print data from an input unit, allocates the plurality of pages of print data to a print image for one sheet of paper, and outputs to a printing unit the print image to be printed on an area larger than an effective area of the paper, thereby performing a marginless printing, the printing apparatus comprising: an input buffering unit for storing a plurality of pages of print data read from the input unit; an allocation unit for performing affine transformation and clipping on the plurality of pages of print data stored in the input buffering unit according to an allocation number specified by a specifying unit and representing the number of print data to be allocated to one sheet of paper and then allocating the processed print data to the print image; and an output buffering unit for storing the print image for one sheet of paper.

[Description 2]

In description 1, the clipping performed by the allocation unit executes processing on print data allocated to the effective area of the paper including its boundary and different processing on print data allocated to other areas of the paper.

[Description 3]

In description 1, the number of print data to be allocated to one sheet of paper, specified by the specifying unit, is entered as positive integers one for each of x and y directions of the paper.

[Description 4]

In description 1, the number of pages to be allocated to one sheet of paper, specified by the specifying unit, is calculated for each of the x and y directions based on an entered value and on x- and y-direction sizes of the paper.

[Description 5]

In description 3, the printing unit can print a print image that is output with at least one side of the paper taken as an arbitrary size, and the allocation unit specifies to the printing unit a size of one side of the paper based on the allocation number entered as positive integers for the x and y directions, and outputs the print image to the printing unit.

[Description 6]

A printing method which inputs a plurality of pages of print data from an input unit, allocates the plurality of pages of print data to a print image for one sheet of paper, and outputs to a printing unit the print image to be printed on an area larger than an effective area of the paper, thereby performing a marginless printing, the printing method comprising: an input buffering step for storing a plurality of pages of print data read from the input unit; an allocation step for performing affine transformation and clipping on the plurality of pages of print data stored in the input buffering step according to an allocation number specified by a specifying unit and representing the number of print data to be allocated to one sheet of paper and then allocating the processed print data to the print image; and an output buffering step for storing the print image for one sheet of paper.

[Description 7]

In description 6, the clipping performed by the allocation step executes processing on print data allocated to the effective area of the paper including its boundary and different processing on print data allocated to other areas of the paper.

[Description 8]

In description 6, the number of print data to be allocated to one sheet of paper, specified by the specifying unit, is entered as positive integers one for each of x and y directions of the paper.

[Description 9]

In description 6, the number of pages to be allocated to one sheet of paper, specified by the specifying unit, is calculated for each of the x and y directions based on an entered value and on x- and y-direction sizes of the paper.

[Description 10]

In description 8, the printing unit can print a print image that is output with at least one side of the paper taken as an arbitrary size, and the allocation step specifies to the printing unit a size of one side of the paper based on the allocation number entered as positive integers for the x and y directions, and outputs the print image to the printing unit.

[Description 11]

A program for executing the steps described in any of descriptions 6 to 10 by using a computer.

[Description 12]

A computer-readable storage media storing a program for executing the steps described in any one of descriptions 6 to 10.

The present invention has been described in detail with respect to preferred embodiments, and it will now be apparent from the foregoing to those skilled in the art that changes and modifications may be made without departing from the invention in its broader aspects, and it is the intention, therefore, in the appended claims to cover all such changes and modifications as fall within the true spirit of the invention.

What is claimed is:

1. A printing apparatus comprising:
   a generation unit for generating one page of a print image which is larger than one sheet of paper; and
   a printing unit for performing printing on one sheet of paper based on one page of the print image, which is larger than the paper and generated by the generation unit,
   wherein the generation unit, based on an allocation number representing the number of pages to be allocated to one sheet of paper, performs a clipping process for each page to remove a portion according to a portion of each page which is not printed by marginless printing to generate the print image so that a portion of a same position of the allocated pages is printed, when a plurality of pages of print data printed on one sheet of paper are generated.

2. A printing apparatus according to claim 1, wherein the generation unit generates a print image by subjecting the pages to zoom processing according to the allocation number.

3. A printing apparatus according to claim 1, wherein the clipping performed by the generation unit executes processing on print data allocated to the effective area of the paper including its boundary and different processing on print data allocated to other areas of the paper.

4. A printing apparatus according to claim 1, wherein the allocation number is positive integers one for each of x and y directions of the paper.

5. A printing apparatus according to claim 1, wherein the allocation number is allocation numbers one for each of x and y directions of the paper and is calculated for each of the x and y directions based on a particular value of the allocation number and on x- and y-direction sizes of the paper.

6. A printing apparatus according to claim 4, wherein the printing unit can print a print image that is output with at least one side of the paper taken as an arbitrary size, and the generation unit specifies to the printing unit a size of one side of the paper based on the allocation number, positive integers for the x and y directions, and outputs the print image to the printing unit.

7. A printing apparatus according to claim 1, wherein the allocation number is a number specified by a specifying unit which specifies the number of pages to be allocated to one sheet of paper.

8. A printing apparatus according to claim 1, wherein the generation unit clips a portion of a particular page overrunning a particular area, one of areas produced by dividing the effective area of the paper based on the allocation number, in such a manner that a positional relationship of the particular page allocated to and larger in size than the particular area with respect to the particular area is identical to a positional relationship of the particular page allocated to and larger in size than the effective area of the paper with respect to the effective area of the paper.

9. A printing method comprising:
   a generation step of generating one page of a print image which is larger than one sheet of paper; and
   a printing step of causing a printing unit to perform printing on one sheet of paper based on one page of the print image, which is larger than the paper and generated by the generation step,
   wherein the generation step, based on an allocation number representing the number of pages to be allocated to one sheet of paper, performs a clipping process for each page to remove a portion according to a portion of each page which is not printed by marginless printing to generate the print image so that a portion of a same position of the allocated pages is printed, when a plurality of pages of print data printed on one sheet of paper are generated.

10. A printing method according to claim 9, wherein the generation step generates a print image by subjecting the pages to zoom processing according to the allocation number.

11. A printing method according to claim 9, wherein the clipping performed by the generation step executes processing on print data allocated to the effective area of the paper including its boundary and different processing on print data allocated to other areas of the paper.

12. A printing method according to claim 9, wherein the allocation number is positive integers one for each of x and y directions of the paper.

13. A printing method according to claim 12, wherein the printing step can print a print image that is output with at least one side of the paper taken as an arbitrary size, and the generation step specifies a size of one side of the paper based on the allocation number, positive integers for the x and y directions, and generates the print image.

14. A printing method according to claim 9, wherein the allocation number is allocation numbers one for each of x and y directions of the paper and is calculated for each of the x and y directions based on a particular value of the allocation number and on x- and y-direction sizes of the paper.

15. A printing method according to claims 9, wherein in the generation step, the allocation number is a number specified by a specifying unit which specifies the number of pages to be allocated to one sheet of paper.

16. A printing method according to claims 9, wherein the generation step clips a portion of a particular page overrunning a particular area, one of areas produced by dividing the effective area of the paper based on the allocation number, in such a manner that a positional relationship of the particular page allocated to and larger in size than the particular area with respect to the particular area is identical to a positional relationship of the particular page allocated to and larger in size than the effective area of the paper with respect to the effective area of the paper.

17. A computer readable medium encoded with a computer program for executing a printing method, the printing method comprising:
   a generation step of generating one page of a print image which is larger than one sheet of paper; and
   a step of outputting to a printing unit to perform printing on one sheet of paper based on one page of the print image, which is larger than the paper and generated by the generation step,
   wherein the generation step, based on an allocation number representing the number of pages to be allocated to one sheet of paper, performs a clipping process for each page to remove a portion according to a portion of each page which is not printed by marginless printing to generate the print image so that a portion of a same position of the allocated pages is printed, when a plurality of pages of print data printed on one sheet of paper are generated.

18. A computer readable medium encoded with a computer program according to claim 17, wherein the generation step generates a print image by subjecting the pages to zoom processing according to the allocation number.

19. A computer readable medium encoded with a computer program according to claim 17, wherein the clipping performed by the generation step executes processing on print data allocated to the effective area of the paper including its boundary and different processing on print data allocated to other areas of the paper.

20. A computer readable medium encoded with a computer program according to claim 17, wherein the allocation number is positive integers one for each of x and y directions of the paper.

21. A computer readable medium encoded with a computer program according to claim 20, wherein the printing step can print a print image that is output with at least one side of the paper taken as an arbitrary size, and the generation step specifies a size of one side of the paper based on the allocation number, positive integers for the x and y directions, and generates the print image.

22. A computer readable medium encoded with a computer program according to claim 17, wherein the allocation number is allocation numbers one for each of x and y directions of the paper and is calculated for each of the x and y directions based on a particular value of the allocation number and on x- and y-direction sizes of the paper.

23. A computer readable medium encoded with a computer program according to claims 17, wherein in the generation step, the allocation number is a number specified by a specifying unit which specifies the number of pages to be allocated to one sheet of paper.

24. A computer readable medium encoded with a computer program according to claims 17, wherein the generation step clips a portion of a particular page overrunning a particular area, one of areas produced by dividing the effective area of the paper based on the allocation number, in such a manner that a positional relationship of the particular page allocated to and larger in size than the particular area with respect to the particular area is identical to a positional relationship of the particular page allocated to and larger in size than the effective area of the paper with respect to the effective area of the paper.

25. A print data generating apparatus to output to a printing unit which performs printing on one sheet of paper, based on one page of the print image generated so as to be larger than one sheet of paper, comprising:
   a setting unit for setting an allocation number representing the number of pages to be allocated to one sheet of paper; and
   a processing unit for performing a clipping process for each page to remove a portion according to a portion of each page which is not printed by marginless printing to generate the print image so that a portion of a same position of the allocated pages is printed, when a plurality of pages of print data printed on one sheet of paper are generated.

26. A print data generating method to output to a printing unit which performs printing on one sheet of paper, based on one page of the print image generated so as to be larger than one sheet of paper, comprising:
   a setting step for setting an allocation number representing the number of pages to be allocated to one sheet of paper; and
   a processing step for performing a clipping process for each image to remove a portion according to a portion of each page which is not printed by marginless printing to generate the print image so that a portion of a same position of the allocated pages is printed, when a plurality of pages of print data printed on one sheet of paper are generated.

* * * * *

UNITED STATES PATENT AND TRADEMARK OFFICE
CERTIFICATE OF CORRECTION

| | | |
|---|---|---|
| PATENT NO. | : 7,391,530 B2 | Page 1 of 1 |
| APPLICATION NO. | : 10/618013 | |
| DATED | : June 24, 2008 | |
| INVENTOR(S) | : Ichiro Matsuyama | |

It is certified that error appears in the above-identified patent and that said Letters Patent is hereby corrected as shown below:

TITLE PAGE; [56] REFERENCES CITED:

FOREIGN PATENT DOCUMENTS, "JP    2001147788    5/2001" should read --JP    2001-147788    5/2001--.

COLUMN 5:

Line 48, "in" should be deleted.

COLUMN 11:

Line 1, "claims 9," should read --claim 9,--.
      Line 5, "claims 9," should read --claim 9,--.

COLUMN 12:

Line 8, "claims 17," should read --claim 17,--.
      Line 13, "claims 17," should read --claim 17--.

Signed and Sealed this

Fifth Day of May, 2009

JOHN DOLL
*Acting Director of the United States Patent and Trademark Office*